Oct. 14, 1924.
H. C. FOLGER
REFRIGERATING APPARATUS
Filed Nov. 30, 1923
1,511,454
3 Sheets-Sheet 1
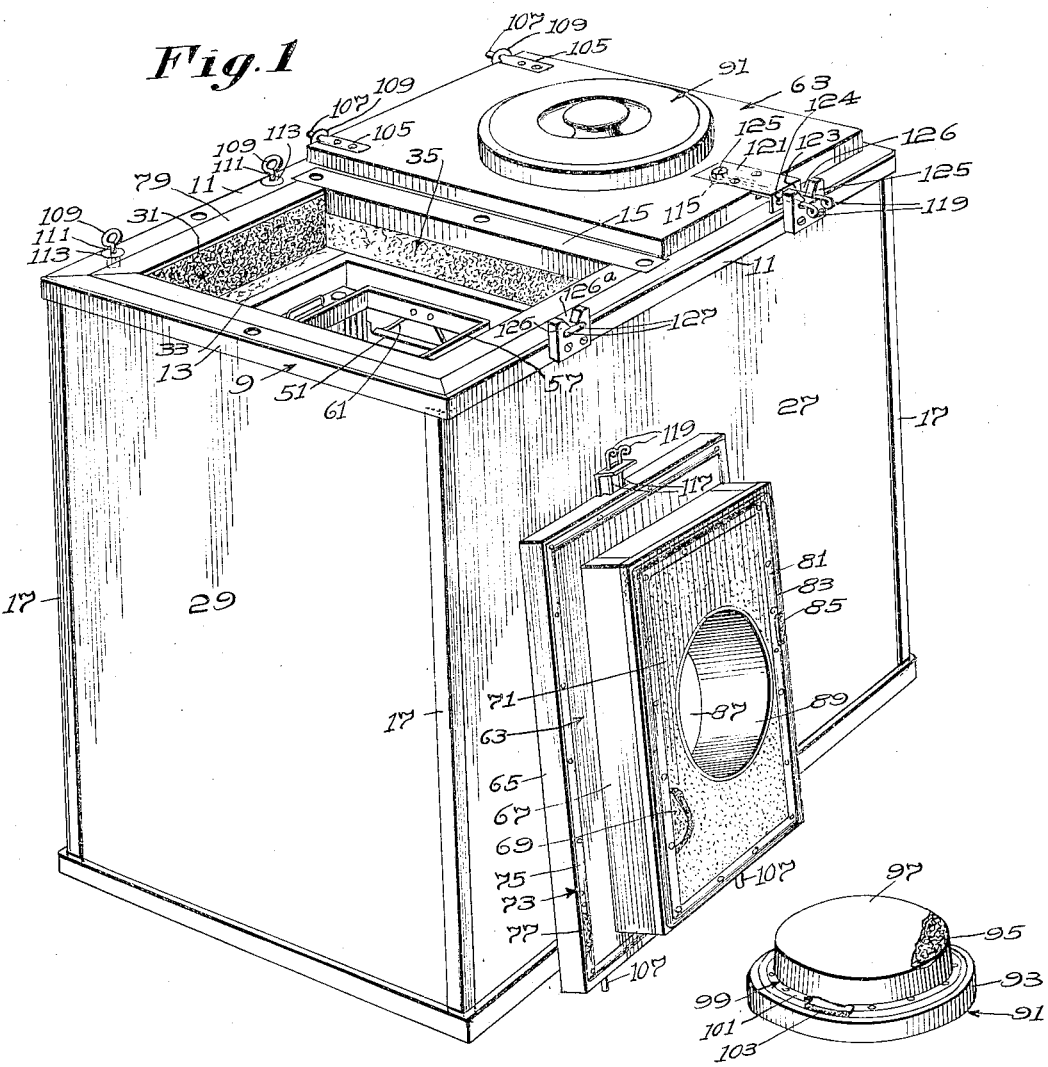
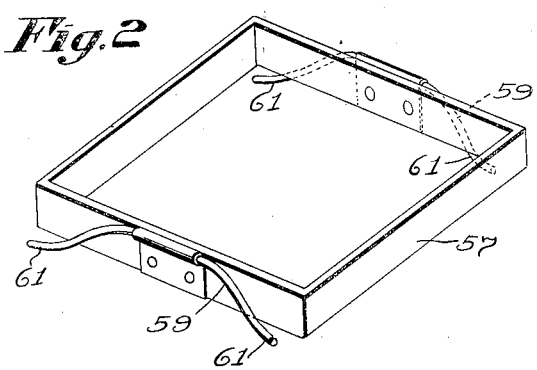
INVENTOR.
Henry C. Folger
BY Henry T. Williams,
ATTORNEY.

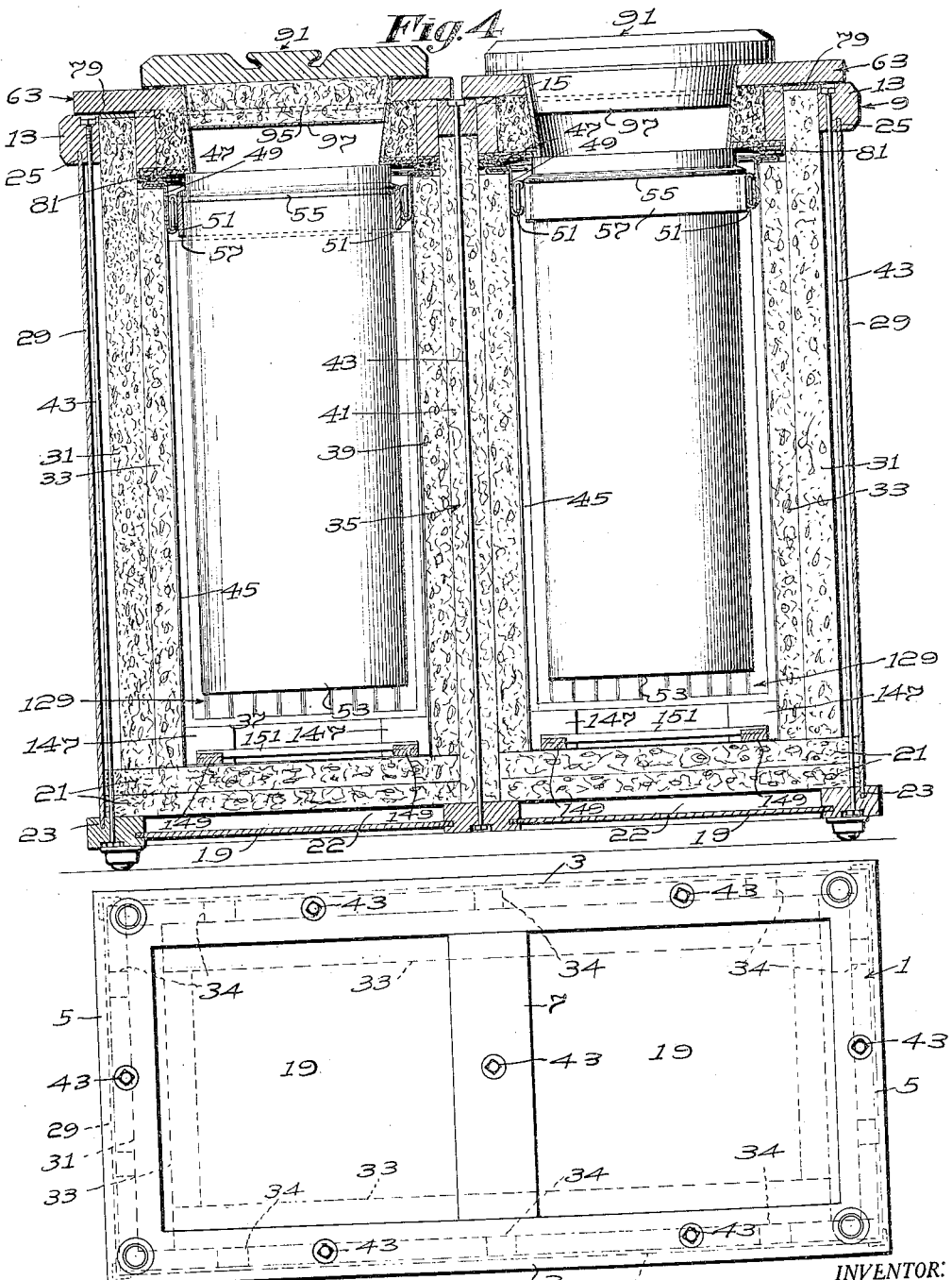

Oct. 14, 1924.
H. C. FOLGER
1,511,454
REFRIGERATING APPARATUS
Filed Nov. 30, 1923 3 Sheets-Sheet 3
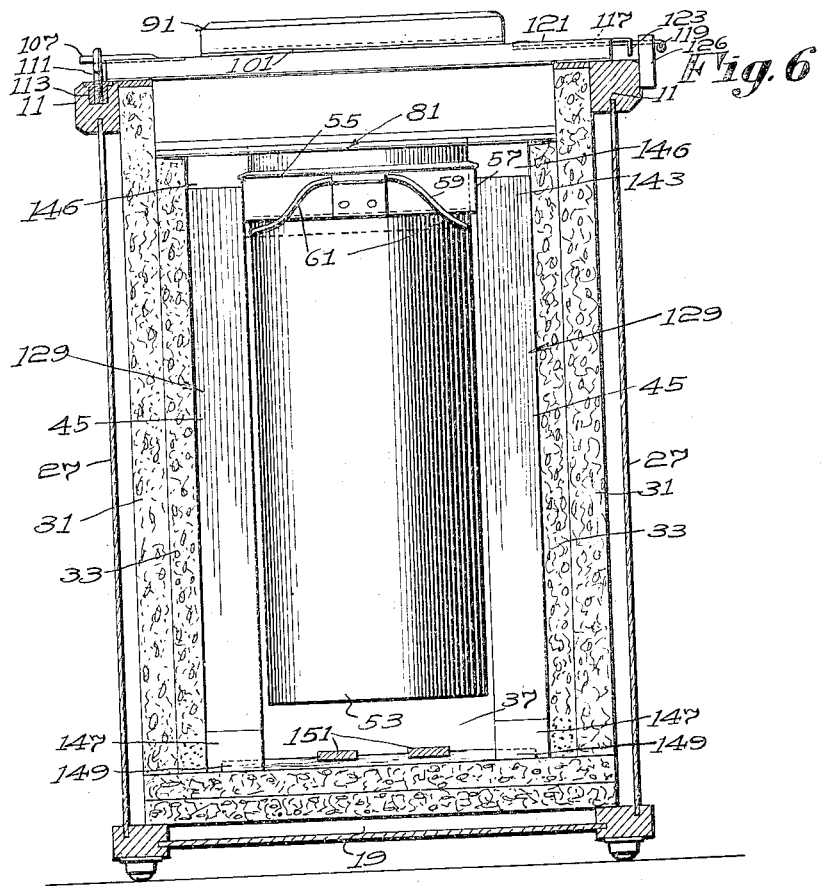
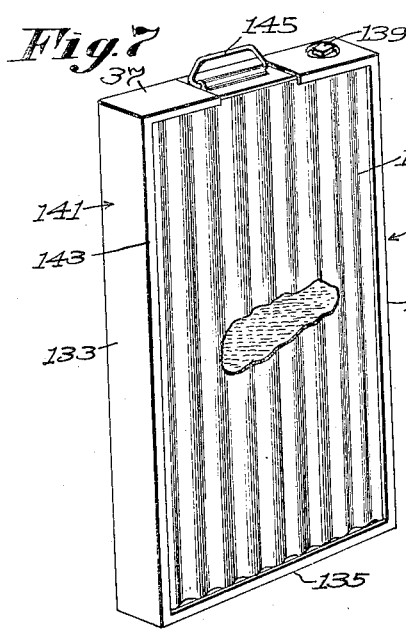
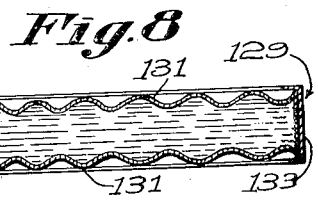
INVENTOR:
Henry C. Folger
BY Henry T. Williams
ATTORNEY.

Patented Oct. 14, 1924.

1,511,454

UNITED STATES PATENT OFFICE.

HENRY C. FOLGER, OF WAVERLY, MASSACHUSETTS, ASSIGNOR TO HOUSING COMPANY, OF BOSTON, MASSACHUSETTS, A CORPORATION OF MASSACHUSETTS.

REFRIGERATING APPARATUS.

Application filed November 30, 1923. Serial No. 677,852.

*To all whom it may concern:*

Be it known that I, HENRY C. FOLGER, a citizen of the United States, residing at Waverly, in the county of Middlesex and State of Massachusetts, have invented certain new and useful Improvements in Refrigerating Apparatus, of which the following is a specification.

The invention to be hereinafter described relates to apparatus for refrigerating ice-cream and other materials.

One of the purposes of the invention is to provide a refrigerator desirably in the form of a cabinet in which the refrigerating effect is produced by containers or cartridges containing a frozen liquid, and preferably a liquid which freezes at a temperature substantially below 32° F. This temperature desirably may be as low as 3° above zero. Different liquids may be employed, such, for example, as a solution of salt and water, or alcohol and water, or calcium chloride and water, all of which have a low freezing point.

The containers or cartridges after being nearly filled with such a solution, are closed and preferably sealed, and are placed in a room or chamber having a temperature sufficiently low to freeze the solution.

The cartridges containing the frozen liquid are placed in the cabinet, and preferably in a space which does not have communication with the space occupied by the materials for refrigeration. The construction is such that when the refrigerator is opened for the purpose of introducing materials for refrigeration therein, or for removing the same therefrom, the space containing the cartridges is not exposed to the warming effect of the outside air. Thus, the cooling effect of the cartridges is materially prolonged.

The same cartridges which are employed for cooling the cabinet, may be employed for cooling materials during transportation.

In my copending application Serial No. 595,840, filed Oct. 20, 1922, is disclosed a truck having a body specially constructed to utilize the frozen liquid containing cartridges for refrigerating materials during transportation.

The truck body is well adapted for transporting cans of ice-cream from the manufacturer to customers, each of whom would be supplied with a cabinet constructed in accordance with the present invention.

This method of refrigeration is disclosed in my copending application Serial No. 595,840 filed Oct. 20, 1922.

The character of the invention may be best understood by reference to the following description of one good form thereof shown in the accompanying drawings, wherein:

Fig. 1 is a perspective view of a cabinet embodying the invention, one of the covers being shown removed from the body of the cabinet;

Fig. 2 is a perspective view of one of the can supporting frames;

Fig. 3 is a perspective view of the cap for one of the covers;

Fig. 4 is a vertical section through the cabinet;

Fig. 5 is a view looking up toward the bottom of the cabinet;

Fig. 6 is a vertical section taken on line 6—6 of Fig. 4;

Fig. 7 is a perspective view of one of the frozen liquid containing cartridges; and Fig. 8 is a transverse section through the cartridge.

Referring to the drawings, the cabinet shown therein as one good form of the invention, comprises a bottom frame 1 (Fig. 5) comprising side bars 3 and end bars 5, and an intermediate bar 7 between the side bars 3. At the top of the cabinet is a frame 9 (Figs. 1, 4 and 6) comprising side bars 11, and bars 13, and an intermediate bar 15, between the side bars 11. These frames may be of wood or other suitable material. Connecting the bottom frame 1 with the top frame 9 at the corners of the cabinet, are upright metal angle bars 17 having their ends set in angle grooves in the top and bottom frames.

Secured to the under side of the bottom frame 1 are floors 19 of wood or other suitable material. Cork layers 21 rest upon the bottom frame. There are air spaces 22 between the lower cork layers and the floors 19. The bottom frame has grooves 23, and the top frame 9 has grooves 25 in which are fitted side panels 27 and end panels 29 of wood, steel or other suitable material. Within and spaced from said panels are outer cork layers 31 and inner cork layers 33. The outer cork layers may be held in spaced relation to the panels by vertical strips 34.

In the present instance of the invention, the cabinet has a partition 35 dividing the same into two compartments or chambers 37. Said partition may be formed of a pair of cork layers 39 and an intermediate cork layer 41.

The walls and partitions thus formed may be held securely in assembled relation with respect to the top and bottom frames by through bolts 43 extending at suitable intervals through bars of the top and bottom frames. Thus a strong construction is provided without the use of screws or nails.

The cork walls of the chambers 37 may have galvanized steel linings 45. The inner cork layers 33 and 39 are somewhat shorter than the layers 31 and 41, and resting on the upper edges thereof are outstanding flanges 47 of collars 49 which extend somewhat down into the linings 45, and are formed to provide seats or ledges 51, for a purpose to be described.

Each of the chambers is adapted to receive a cell or chamber to contain the materials for refrigeration. In the present instance of the invention, this cell is in the form of an ice-cream can 53 (Fig. 4) of cylindrical form, and desirably having a capacity of five gallons. Adjacent the upper edge of the can is a circumferential outstanding bead 55.

Suitable means may be provided yieldingly to support the can in the chamber 37. In the present instance, this means comprises a rectangular frame 57 (Fig. 2) having at opposite sides thereof wire springs 59 of yoke form, and having feet 61 projecting downward from the frame somewhat and adapted to rest upon the seats 51 referred to.

The can may be lowered through the frame 57 into the chamber 37 until the bead 55 of the can reaches and rests upon the upper edges of the frame 57.

Each of the chambers may be provided with a cover 63 (Figs. 1, 4 and 6) having a top layer 65 of wood. Projecting inward from the layer 65 is a frame 67 in which is placed a block 69 of cork and an outer thin layer 71 of a high grade, more compact form of cork known as gasket cork. The under face of the top layer 65 of the cover is provided with a packing 73 desirably in the form of rubber tubing 75 stuffed with a cotton core 77. This packing is adapted to rest against a wood frame 79 resting upon the upper edges of the cork layers 31 referred to. The inner face of the frame 67 of the cover is provided with a packing 81 desirably in the form of rubber tubing 83 stuffed with a cotton core 85. This packing is adapted to rest against the flange 47 of the collar 49 referred to.

The cover has a tapered opening 87 therein having an aluminum lining 89. This opening is normally closed by a cap 91 comprising a top layer 93 of wood, on the inner face of which is a cork disk 95 enclosed in an aluminum covering 97. On the inner face of the top layer 93 is a packing 99 desirably in the form of rubber tubing 101 stuffed with a cotton core 103. When the cap is placed over the opening, the packing 99 will engage the margin of the cover surrounding the opening, and provide a tight closure of the cap on the cover.

To secure the covers in closed position, each of them may have a pair of straps 105 secured to the rear portion thereof and having outstanding pins 107 for insertion into eyes 109 of screws 111 threaded in metal sockets 113 set into and secured to the top frame.

At the front of each cover is a latch comprising a spring wire bent to present an eye 115 and arms 117 having handles 119 at ends thereof. This latch is set in a recess in the cover beneath a plate 121 secured to the cover and having a downward projecting flange 123 with an elongated slot 124 therein. A screw 125 is entered through the plate and the eye 115 and the arms 117 project out through the slot 124, the ends of which limit the outspreading of the arms due to the resilience of the wire. A lock plate 126 is scoured to the top frame and has a flaring mouth 126a leading to the lock slots 127.

The construction is such that when it is desired to close the cover, the pins 107 are inserted into the eyes 109 and then the cover is pressed down causing the arms 117 to pass through the flaring mouth 126 and then snap out into locking engagement with the slots 127.

Closing of the covers will compress the packings 73 into tight engagement with the frames 79, and press the packings 81 into tight engagement with the collar flanges 47.

The relation of the covers to the upper edges of the cells or cans 53 referred to, is such that the gasket cork layers 71 will come into engagement with the upper edges of the cans before the covers are tightly closed. The eye screws 111 may be adjusted so that the downward pressure of the covers to tight closed position will cause the covers to press the cans downward somewhat against the yielding resistance of the yoke springs 59 which support the frames 57 on which the circumferential beads 55 of the cans rest. As a consequence, when the covers are closed, the inner faces of the covers and the upper edges of the cans are in tight engagement.

As stated, cartridges containing a frozen liquid are placed in the cabinet to refrigerate the same. In the present instance of the invention, each of these cartridges 129 (Figs. 7 and 8) is of oblong form and has opposed sides 131 which preferably are corrugated. The cartridge has edges 133, a bottom 135, and a top 137, the latter being provided with a neck normally closed by a screw plug 139. The cartridge may be formed of sheet metal, and to contribute to the strength thereof, the bottom, top and edges may be embraced by a channel-shaped reinforcing band 141 having its flanges 143 inturned and overlapping the corrugated sides of the cartridge. The spaces between the flanges and the corrugations may be filled with solder or other suitable material which may be bevelled away from the edges of the flanges to facilitate sliding the cartridges on top of one another in the freezing room. At the top of the cartridge is a handle 145, and the channel is broken away to permit the handle to be rocked down flush with the outer face of the portions of the channel at the top of the cartridge.

The cartridge is nearly filled with the liquid to be frozen, and then the plug 139 may be inserted into the neck and may be soldered thereto or otherwise permanently secured. The cartridge thus constructed is an effective unit for the purposes. The corrugated sides provide extended surfaces contributing to quick freezing of the liquid in the cartridges, and contributing to effective refrigeration effect. Also, the corrugations add to the strength of the cartridge and allow expansion and contraction of the sides under temperature changes without straining the cartridge or opening the seams thereof.

The chambers in the cabinet may be formed to receive the cartridges, and in the present instance of the invention, each of the chambers has spaces 146 at opposite sides of the can for receiving two cartridges. When the cover for one of the chambers is opened, two of the cartridges may be readily lowered into said spaces, where they will desirably serve to refrigerate the ice-cream or other materials in the cell or can in said chamber. At the bottom of each chamber there may be provided a frame comprising four blocks 147 connected by a pair of slats 149. Secured to the latter and extending transversely thereof are a pair of slats 151. The cartridges may rest upon the blocks 147, and bricks of ice-cream or other materials may be placed upon the slats 151, if desired.

It will be noted that there is an air space around the can and at the top and bottom thereof through which the cooling effect of the cartridges may be transmitted and distributed to the can.

When the ice-cream cans and the cartridges are conveyed to customers in the truck referred to, the driver on reaching each customer, may take two ice-cream containing cans and four cartridges from the truck and place one of the cans and two of the cartridges in each of the chambers of the cabinet, and thus, the same cartridges which refrigerate the ice-cream cans while on the truck, also will serve to refrigerate the ice-cream cans after the latter are placed in the cabinet.

The openings 87 in the covers receiving the caps 91 are smaller in circumference than the cans, and therefore, when the caps are opened for the purpose of removing ice-cream or other materials from the cans, the spaces 146 occupied by the cartridges will not be exposed to the outside air and the warming effect thereof. This is an important feature of the invention, since liquid frozen at a temperature so low as that employed in freezing the liquid in the cartridges is quickly responsive to the effect of temperatures warmer than that of the liquid.

Heretofore, it has been customary to pack ice and salt about the ice-cream containing cans in a cabinet. The cooling effect of the ice and salt packed in the cabinet diminishes, and usually ice and salt must be repacked about the can, in order to continue the required cooling effect. This results in a variable refrigeration, causing the ice-cream some of the time to be either too hard or too soft. Also, the use of ice and salt for this purpose is a substantial item of expense.

However, by the present invention, the necessity for packing ice and salt about the ice-cream cans is eliminated; the cartridges have a substantially uniform cooling effect, so that the ice-cream dispensed from the cans does not become too hard or too soft; and the use of the cartridges results in an important saving in time, since no time is lost in packing ice and salt about the cans, removing melted ice, and repacking ice and salt about the cans.

It is important that the partition 35 which divides the cabinet into two chambers, shall be provided and made of cork or other suitable heat insulation material, and that the two chambers shall be provided with separate covers. As a result, when one of the covers is opened or its cap is removed, the other chamber or the container therein will not be exposed to the temperature raising effect of the warmer outside air. Also, if one of the chambers is emptied, the cartridges in the other chamber will not have the increased duty of refrigerating the emptied chamber.

The total surfaces of the cartridges may have a predetermined ratio in respect to the total inner surfaces of the bottom of the chamber and the walls of the chamber other than the partition which divides the cabinet into two chambers. Three of the walls are subject to the temperature raising effect of the warmer outside air, whereas, the partition being between the two refrigerated chambers is not subject to such temperature raising effect. An example of such ratio for good practical purposes may be about one square foot of cartridge surface to one square foot of wall or bottom surface exposed to the temperature raising effect of the warmer outside air. Thus the cartridges will have a cooling radiating surface effectively tending to counteract the warming influence of the air on the outer surfaces of the bottom and the three walls of the chamber. The corrugated sides of the cartridges materially increase the radiating surfaces of the cartridges without adding to the overall dimensions thereof, and therefore, cartridges may be provided sufficiently small to be readily handled and still be effective for the purposes stated.

It will be understood that the invention is not limited to the specific embodiment shown, and that various deviations may be made therefrom without departing from the spirit and scope of the appended claims.

What is claimed is:—

1. Refrigeration apparatus comprising a cabinet having walls formed of outer wood, inner metal, and intermediate cork layers, said inner layers having ledges thereon, a frame having springs supported on said ledges, a can having a circumferential bead resting on said frame to support the can thereon, said cabinet having spaces for receiving frozen liquid containing cartridges at sides of the can, a cover for the cabinet having its under face adapted to engage the upper edge of the can, securing means for the cover having provision for pressing the can downward in the cabinet against the resistance of the frame supporting springs, said cover having an opening therein smaller than the upper end of the can through which materials may be removed from the can without exposing to the outside air the spaces receiving the cartridges, and a cap normally closing said opening.

2. Refrigeration apparatus comprising a cabinet having a chamber therein, a can in said chamber for receiving materials for refrigeration, said chamber being adapted to receive a frozen liquid containing cartridge for cooling the chamber containing the can, a cover for the chamber having its under face adapted for engagement with the rim of the can, means to secure the cover in closed position, and means for pressing the upper edge of the can into tight engagement with the under face of the cover.

3. Refrigeration apparatus comprising a cabinet having a chamber therein, a can in said chamber for receiving materials for refrigeration, said chamber being adapted to receive a frozen liquid containing cartridge for cooling the chamber containing the can, a cover for the chamber having its under face adapted for engagement with the rim of the can, means to secure the cover in closed position, means for pressing the upper edge of the can into tight engagement with the under face of the cover, said cover having an opening therein smaller than the upper end of the can, and a cap for closing said opening.

4. Refrigeration apparatus comprising a cabinet having a chamber therein, a can in the chamber for receiving materials for refrigeration, a frozen liquid containing cartridge mounted in the chamber for cooling the materials in the can, a cover for the chamber having margins for engagement with the top of the cabinet, said cover having a portion within said margins for engagement with the upper edge of the can and having an opening therein smaller than the can, a cap for the opening, means for securing the cover in closed position, and means for automatically pressing the upper edge of the can and the cover into tight engagement with each other when the cover is closed.

5. A refrigerator comprising a chamber having walls provided with heat insulation layers, a container in said chamber for receiving materials for refrigeration, said chamber having an air space adjacent the container, a frozen solution containing cartridge in said air space for cooling the container and the materials therein, a cover for the chamber having provision for closing the cartridge receiving space from the interior of the container, said cover having an opening affording access to the interior of the container without exposing the cartridge receiving space to the outside atmosphere, and means normally closing said opening.

6. A refrigerating cabinet having a chamber therein, a container in said chamber for receiving materials for refrigeration, said container being smaller than said chamber thereby to leave spaces at sides thereof, frozen liquid containing cartridges in said spaces for cooling the container and the materials therein, a cover for the chamber, means to cause the cover and the upper end of the container tightly to engage each other when the cover is closed, thereby to prevent communication between the cartridge receiving spaces and the interior of the container, said cover having an opening therein enabling access to the interior of the container without exposing the cartridge receiving spaces to the outside air, and means normally closing said opening, said cover being movable to permit insertion of the container and the cartridges in said chamber and removal thereof from said chamber.

7. A refrigerating cabinet having a chamber therein provided with seats, a frame having springs supported on said seats, a container in said chamber having an open upper end, and an outstanding member resting on said frame that the container may be yieldingly supported in said chamber, said container being smaller than said chamber, thereby to provide spaces at sides thereof, frozen liquid containing cartridges mounted in said spaces for cooling the container and materials therein, a cover for the chamber for engaging the upper end of the container and closing the cartridge receiving spaces from communication with the interior of the container, said cover having an opening therein smaller than the open upper end of the container enabling access to the interior of the container without exposing the cartridge receiving spaces to the outside air, and a removable cap for said opening.

8. A refrigerating cabinet having a chamber therein, walls surrounding the chamber formed to provide a ledge a short space beneath the top of the cabinet, a container in the chamber, means yieldingly to support the container in the chamber, said container being smaller than the chamber to provide an air space around the container, a frozen liquid containing cartridge in said space for cooling said space and the container, a cover having a portion for engagement with the ledge and the upper edge of the container, thereby to close the cartridge receiving space from the outside air, the upper edge of the container being pressed against said portion of the cover by the means yieldingly supporting the container, said cover having an opening therein smaller than the open end of the container, and a cap for said opening.

9. A refrigerating cabinet having a chamber therein, walls surrounding said chamber formed to provide a ledge beneath the upper end of the chamber, a container mounted in said chamber, a frozen liquid containing cartridge in the chamber for cooling the latter and the container, a cover having a portion for engagement with the upper edge of the container, packing means providing tight engagement between the ledge and a portion of the cover, packing means providing tight engagement between the upper ends of the walls and an outstanding portion of the cover, the latter having an opening therein enabling access to the interior of the container, and a cap for said opening.

HENRY C. FOLGER.